US006971519B2

(12) United States Patent
Fries

(10) Patent No.: US 6,971,519 B2
(45) Date of Patent: Dec. 6, 2005

(54) CONFIGURATION OF A FLAT CARRIER WITH A CHIP MODULE IN A PADDED ENVELOPE AND METHOD OF ARRANGING THE CONFIGURATION

(75) Inventor: Manfred Fries, Hunderdorf (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/306,181

(22) Filed: Nov. 27, 2002

(65) Prior Publication Data

US 2003/0080025 A1 May 1, 2003

Related U.S. Application Data

(63) Continuation of application No. PCT/DE01/01088, filed on Mar. 21, 2001.

(30) Foreign Application Priority Data

May 29, 2000 (DE) .................... 100 26 639

(51) Int. Cl.⁷ .............................. B65D 85/48

(52) U.S. Cl. ................ 206/454; 206/449; 53/460; 53/473

(58) Field of Search ................ 206/449, 454, 206/460, 813; 235/380, 454, 486; 283/61, 283/62, 74, 75, 904; 264/132, 263, 266, 267; 53/452, 460, 461, 467, 473, 476

(56) References Cited

U.S. PATENT DOCUMENTS

| 4,741,147 | A | | 5/1988 | Noll |
| 5,529,345 | A | | 6/1996 | Kohls |
| 5,743,567 | A | | 4/1998 | Warther |
| 5,760,381 | A | * | 6/1998 | Stich et al. ................. 235/380 |
| 5,777,305 | A | * | 7/1998 | Smith et al. ................ 235/380 |
| 5,842,629 | A | * | 12/1998 | Sprague et al. ............ 206/449 |
| 5,894,006 | A | * | 4/1999 | Herbst ....................... 264/132 |
| 5,975,302 | A | * | 11/1999 | Young ........................ 206/449 |
| 6,109,439 | A | * | 8/2000 | Goade, Sr. .................. 206/454 |

FOREIGN PATENT DOCUMENTS

| DE | 31 11 516 A1 | 12/1982 |
| DE | 44 15 667 A1 | 11/1995 |
| DE | 298 18 829 U1 | 5/1999 |
| JP | 4-102260 | 9/1992 |
| JP | 9-175060 | 7/1997 |
| JP | 11-011492 | 1/1999 |
| JP | 11-126238 | 5/1999 |

* cited by examiner

Primary Examiner—Luan K. Bui
(74) Attorney, Agent, or Firm—Laurence A. Greenberg; Werner H. Stemer; Ralph E. Locher

(57) ABSTRACT

A configuration of a flat carrier with a chip module in a padded envelope, which can be transported in a transport device in the direction of one of the envelope's side edges, includes disposing the chip module in the padded envelope such that wire connections in the chip module extend over a side of the semiconductor chip that runs parallel to the transport device. Such a configuration is made possible by the fact that the flat carrier is applied in a standard way to a further carrier, which is folded in a suitable way.

24 Claims, 3 Drawing Sheets

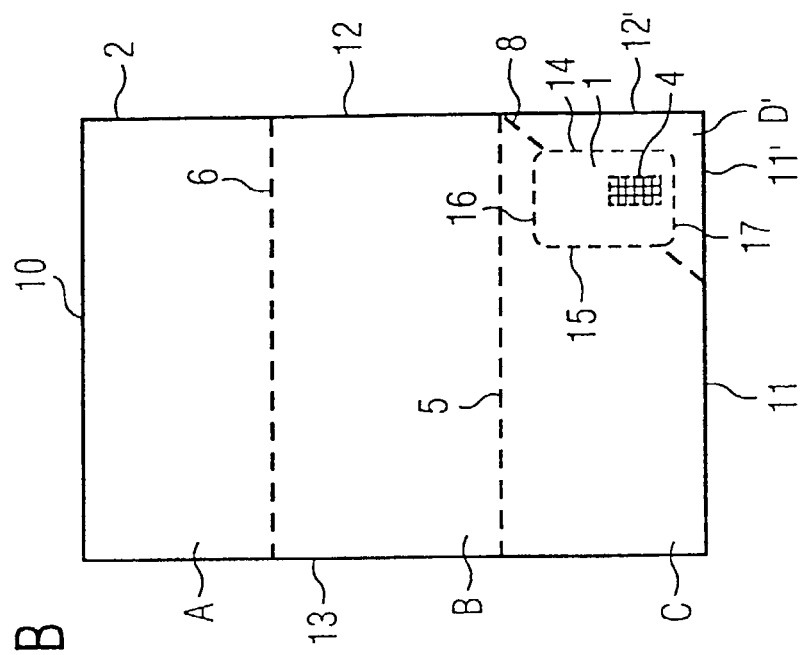
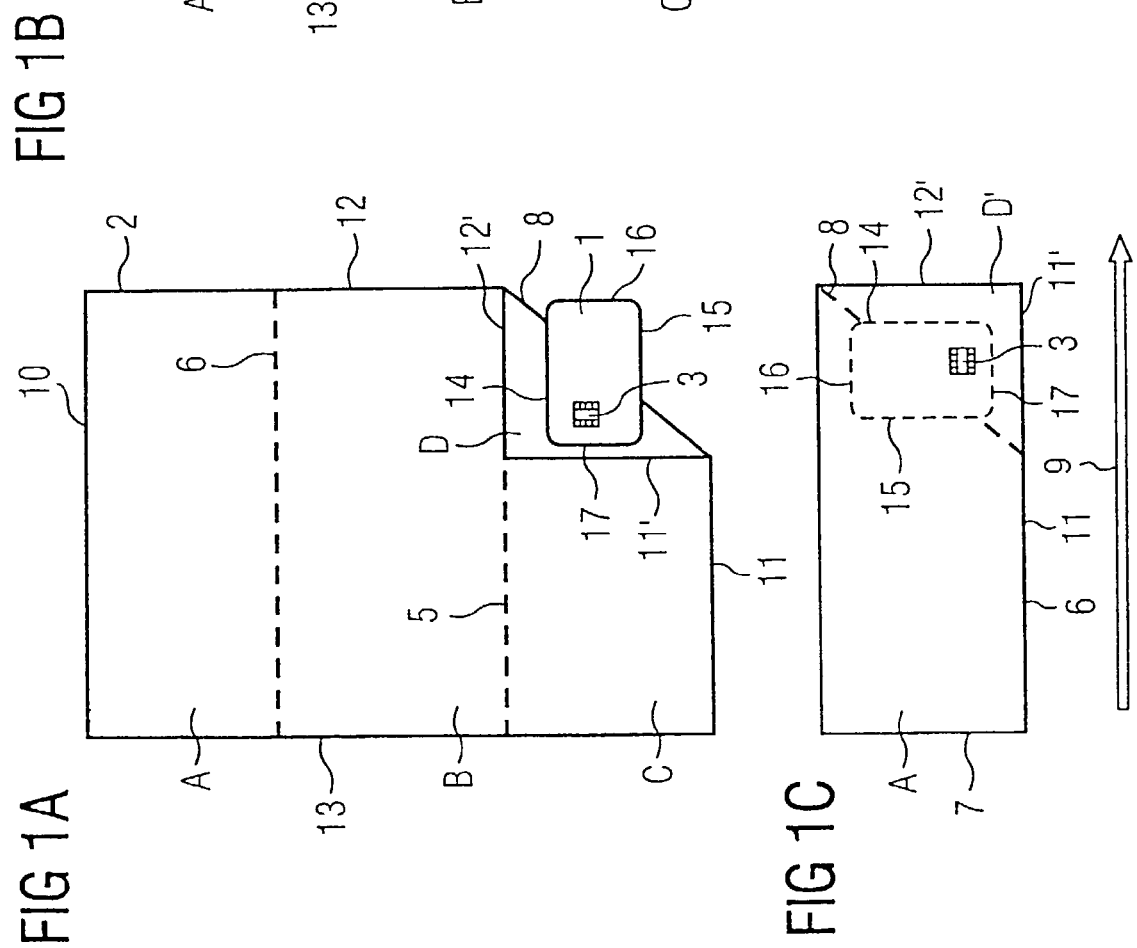

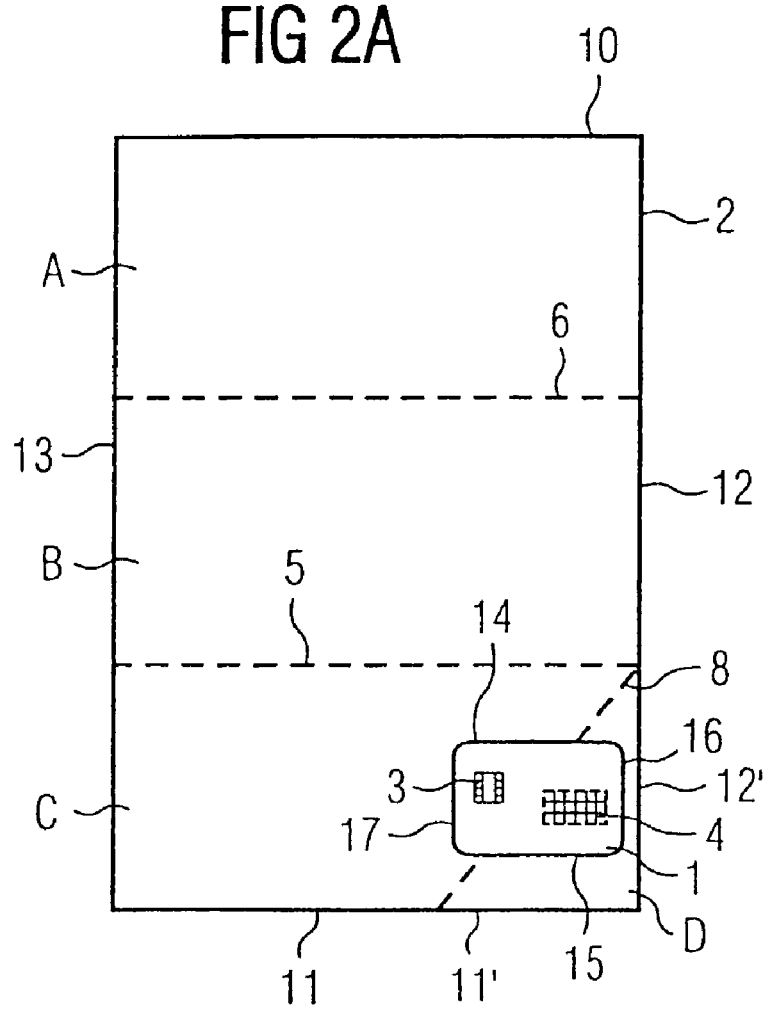
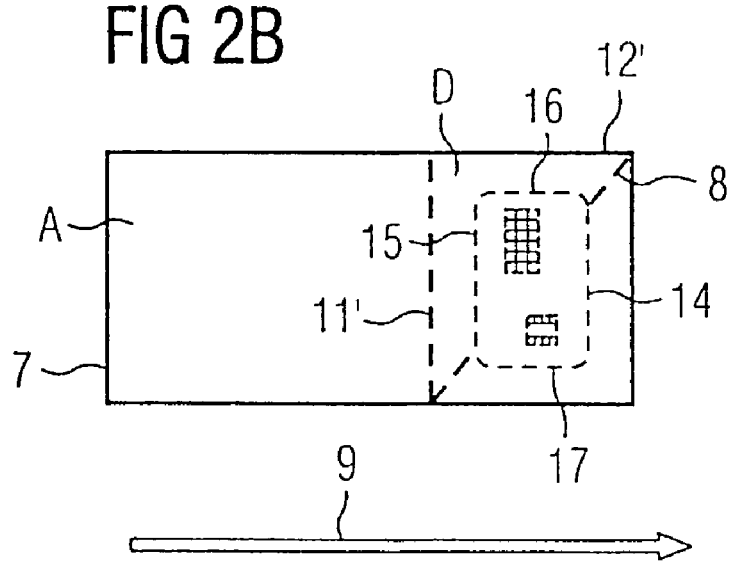

Prior Art FIG 3A
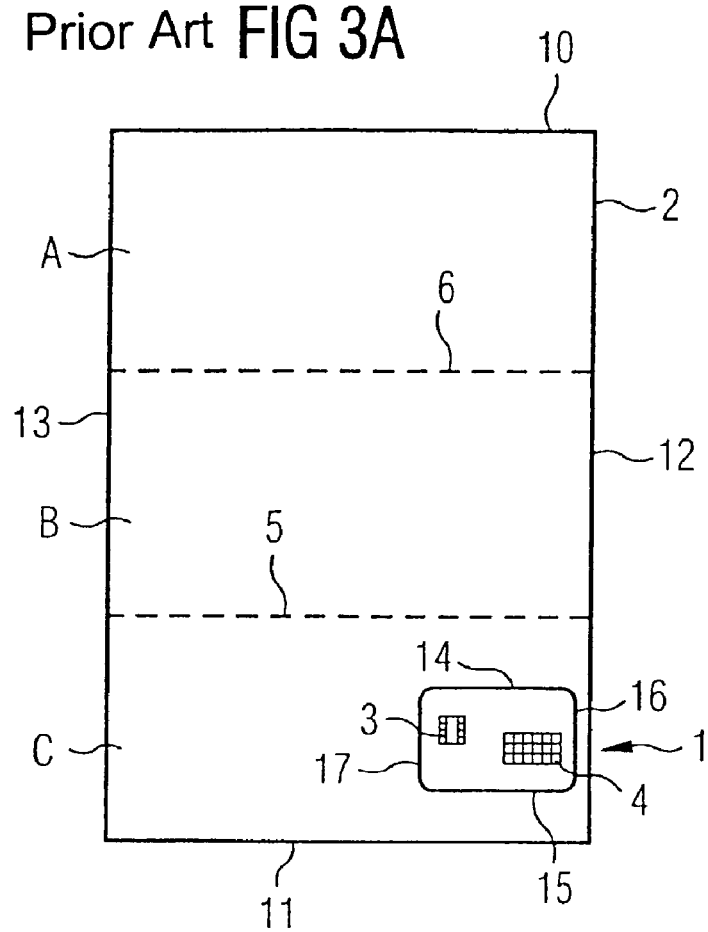
Prior Art FIG 3B
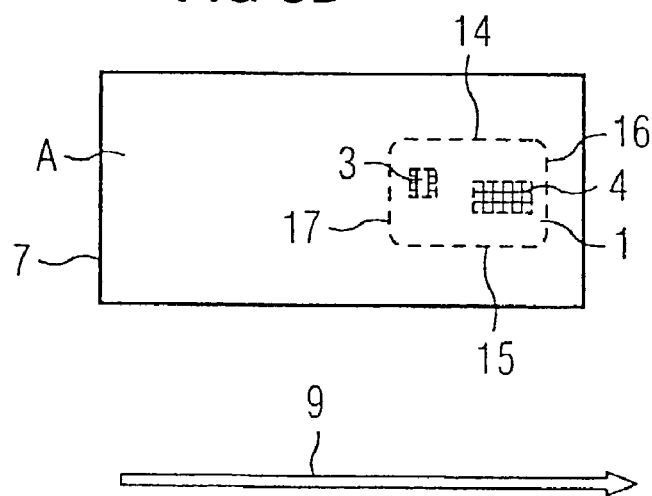

CONFIGURATION OF A FLAT CARRIER WITH A CHIP MODULE IN A PADDED ENVELOPE AND METHOD OF ARRANGING THE CONFIGURATION

CROSS-REFERENCE TO RELATED APPLICATION

This application is a continuation of copending International Application No. PCT/DE01/01088, filed Mar. 21, 2001, which designated the United States and was not published in English.

BACKGROUND OF THE INVENTION

Field of the Invention

The invention relates to a configuration of a flat carrier with a chip module in a padded envelope, it being possible for the padded envelope to be transported in a transport device in the direction of one of its side edges.

Flat carriers with a chip module are sufficiently well known from the prior art. They are typically implemented in a card form (for example, in a credit card format) with an inlaid integrated circuit component. These flat carriers are, then, referred to as smart cards. Smart cards of the aforementioned type are subjected to different stresses during use. Because of the constructional conditions with a card body and a chip module, high flexural stresses can act on the configuration and, depending on the structure, can lead to failures, caused, for example, by chip breakage or breakage of an electrical connection. The susceptibility of such a configuration depends on the chip size, on the length of a bonding-wire connection between the contact pads of the semiconductor chip and the contact tabs of the chip module, and also on the materials used.

A chip module in the prior art usually has a carrier that is of epoxy resin. Fitted to a first main side of the carrier is a semiconductor chip that, for example, is connected to the carrier by adhesive bonding or lamination. On a main side of the carrier lying opposite the first main side, a metallization is applied. The metallization has contact tabs and forms the subsequently externally accessible contacts of the chip module. The metallization typically has six or eight mutually electrically isolated contact tabs, which are each connected through bonding wires to contact pads belonging to the semiconductor chip. The bonding wires are, generally, led through recesses in the carrier. The contact pads are disposed on the semiconductor chip in two rows extending in parallel. Each of the rows lies parallel and adjacent to one side edge of the semiconductor chip. The bonding wires, then, extend over the two parallel side edges to the contact tabs. For the purpose of mechanical protection of the semiconductor chip and of the bonding wires, a potting compound is applied to the first main side, surrounding the semiconductor chip and the bonding wires.

A major proportion of the smart cards, for example, health insurance cards, bank cards, or customer cards, are sent to the customer by letter post. For such a purpose, an adhesive strip fixes the smart card to a carrier, generally a paper.

The configuration that is usual in the prior art is illustrated in FIG. 3A, which shows a carrier 2, for example, a paper, which may be present in the DIN A 4 format, for example. The paper 2 has two opposite short side edges 10, 11 and two opposite long side edges 12, 13. To put the paper 2 into an envelope, it is generally folded twice. One common folding is identified by the folding lines 5, 6, as a result of which the paper 2 is divided into three approximately equal-sized thirds A, B, C. In the description that follows below, the area A is to represent the upper third of the paper, in which the address field is placed.

The smart card 1 is usually fixed in the lowest area C, being disposed in the right-hand half of the area C. In such a case, the smart card 1 comes to lie in such a configuration that its long side edges 14, 15 are oriented parallel to the short side edges 10, 11 of the paper 2. Reference numeral 4 identifies an area in which the smart card 1 is fixed to the paper 2, for example, by a double-sided adhesive tape or a liquid adhesive.

Reference numeral 3 represents the chip module with its contact areas resting on the surface of the smart card 1. Following adhesive bonding of the smart card 1, the contact areas of the chip module 3 can be seen by the observer. In accordance with a standard, the eight contact areas of a chip module are configured in two rows disposed parallel beside one another. The contact tabs of the chip module 3, located beside one another in a row, in this case, come to lie parallel to the short side edges 16, 17 of the smart cart 1 and parallel to the long side edges 12, 13 of the paper 2.

FIG. 3B illustrates (not true to scale) how the flat carrier 1 comes to lie in a padded envelope 7 after the paper 2 has been folded. The dashed outlines of the smart card are intended to illustrate that, following the folding of the paper 2 along the folding lines 5, 6, the area A with the address field can be seen by the observer, while the smart card is hidden by the paper 1 (areas A and B).

Arrow 9 represents a transport direction of the padded envelope in a letter sorting installation. In such a case, the transport direction 9 is placed parallel to the long side edges of the padded envelope 7. The padded envelope 7 that, for example, is suitable for holding a DIN A 4 paper can be implemented, for example, in the DL DIN format (width 220 mm, height 110 mm).

As a result of the high speeds at which the padded envelopes are transported in the letter sorting installation, and on account of small bending radii, caused by deflection rollers in the letter sorting installation, the chip module can be highly stressed, as mentioned above.

To keep the forces acting on the smart card as low as possible, attempts have, therefore, been made in the past to divert the tensile and compressive forces acting onto the adhesive connection between the chip module and the card-like body of the smart card either by increasing the bending resistance of the module in the semiconductor chip and in the bonding wire area by using particularly hard coverings or by using stiffening elements, for example, frames on the first main side of the chip carrier. For such a purpose, use is made of "hot-melt adhesives" to connect the chip module to the card-like body because these have proved to be particularly advantageous, on account of the elastic properties.

Nevertheless, in the event of high bending stresses, it is possible for damage to occur to the semiconductor chip or to the bonding wire connections in the chip module.

SUMMARY OF THE INVENTION

It is accordingly an object of the invention to provide a configuration of a flat carrier with a chip module in a padded envelope and method of arranging the configuration that overcome the hereinafore-mentioned disadvantages of the heretofore-known devices and methods of this general type and that provides a simple possible way with which damage to the aforementioned chip module can be avoided when smart cards are dispatched in a padded envelope.

With the foregoing and other objects in view, there is provided, in accordance with the invention, a configuration for transporting a chip module carrier, including a padded envelope having side edges to be transported in a transport device along a transport direction corresponding to at least one of the side edges, and a flat carrier having a chip module with a semiconductor chip and wire connections connected to the semiconductor chip, the flat carrier being disposed in the padded envelope to extend the wire connections over a side of the semiconductor chip running parallel to the transport direction.

According to the invention, the chip module is disposed in the padded envelope such that wire connections in the chip module extend over a side of the semiconductor chip that extends parallel to the transport direction.

In accordance with another feature of the invention, the flat carrier is a smart card.

The invention is based on the finding that the defect on the chip module is caused by the fact that the wire connections in the chip module in the prior art extend substantially in the direction of the transport direction of the letter sorting installation. If the smart card with the chip module were guided over a deflection roller, then the wire connection would experience stretching corresponding to the bending radius that, in the least favorable case, can lead to breakage of the wire connection. If, then, the chip module, that is to say, the smart card with the chip module, is disposed in the padded envelope such that no more stretching of the wire connection by the deflection roller can take place, then the defect in a smart card is substantially reduced. For such a purpose, the chip module must be rotated substantially through 90° as compared with the conventional position. If the smart card is a configuration having contacts, that is to say, with contact tabs, then the contact tabs placed beside one another in a row are then placed parallel to the transport direction of the letter sorting installation or conveying installation.

In accordance with a further feature of the invention, the flat carrier with the chip module is advantageously detachably fixed to a further carrier, for example, a paper. The connection between the flat carrier and the further carrier can be made by a double-sided adhesive strip or a liquid adhesive.

In accordance with an added feature of the invention, the further carrier is advantageously matched in its dimensions to the padded envelope.

In accordance with an additional feature of the invention, the padded envelope has internal dimensions and the further carrier has external dimensions substantially matched to the internal dimensions of the padded envelope for fitting into the padded envelope.

In such a case, the further carrier can be matched to the dimensions of the padded envelope both in its overall external dimensions or matched to the dimensions of the padded envelope by suitable folding.

In accordance with yet another feature of the invention, the flat carrier with the chip module is, advantageously, disposed in the padded envelope such that the carrier is placed in an area that cannot be stamped by a stamping or franking machine.

In other words, the padded envelope has an area at which the padded envelope is stamped by a stamping or franking machine and the chip module is disposed in the padded envelope to place the chip module outside the area. Letters are usually franked and stamped on the upper right-hand side. This means that the chip module can either come to lie on the lower right-hand side or in the left-hand half of the padded envelope, if an address field is not hidden thereby.

If the flat carrier is configured as a smart card with standardized dimensions, then, according to an advantageous refinement, the smart card comes to lie with its long sides at right angles or orthogonal to the transport direction of the padded envelope.

The position of the smart card on the further carrier can be achieved by this area being adhesively bonded to the further carrier rotated through 90° with respect to the usual position by a suitably configured machine. However, because of the system, the enveloping installations are frequently merely able to bond the smart card only in the standard position (compare FIG. 3A described at the outset).

To make the rotation of the smart card through 90° possible even in the conventional enveloping machines, although the smart card is applied to the flat carrier in the manner described in FIG. 3A, additional folding of the flat carrier in the area of the smart card can lead to the desired result.

With the objects of the invention in view, in a padded envelope having side edges to be transported in a transport device along a transport direction corresponding to at least one of the side edges, there is also provided a chip module carrier transporting configuration, including a flat carrier having a chip module with a semiconductor chip and wire connections connected to the semiconductor chip, the flat carrier to be disposed in the padded envelope to extend the wire connections over a side of the semiconductor chip running parallel to the transport direction.

With the objects of the invention in view, there is also provided a method for configuring a flat carrier with a chip module in a padded envelope, including the steps of applying the flat carrier with the chip module to an area of a further carrier, folding the further carrier to create a folding line traversing the area occupied by the flat carrier, and enveloping the further carrier in the padded envelope.

With the objects of the invention in view, there is also provided a method for configuring a flat carrier with a chip module in a padded envelope, including the steps of folding the further carrier with the chip module at a folding line from an original shape of the further carrier, applying the flat carrier to the further carrier to at least partly traverse the folding line with the flat carrier, folding the further carrier back at the folding line to place the further carrier in the original shape, and enveloping the further carrier in the padded envelope.

In other words, the procedure according to the invention includes the steps of:
a) applying the flat carrier to a further carrier;
b) folding the further carrier so that the folding line traverses the area occupied by the flat carrier; and
c) enveloping the further carrier in the padded envelope.

Alternatively, the method of disposing the flat carrier with a chip module can include the steps of:
a) folding the further carrier;
b) applying the flat carrier to the further carrier so that the latter at least partly traverses the folding line;
c) folding the further carrier back so that the latter assumes its original form; and
d) enveloping the further carrier in the padded envelope.

The result of additionally folding the flat carrier through 45 degrees in the area of the flat carrier is that the flat carrier is, then, rotated through 90 degrees in the padded envelope.

In accordance with yet a further mode of the invention, the folding line, advantageously, runs from one side edge of the further carrier to an orthogonally located side edge. Thereby, a triangular area is formed, in which the flat carrier is fixed. The triangle formed by the additional folding line is advantageously equilateral so that the additional folding line assumes the desired 45° angle with respect to the orthogonal side edges.

In accordance with yet an added mode of the invention, the flat carrier is, advantageously, fixed to the further carrier such that the chip module faces the side edges of the further carrier that do not intersect any folding lines. Such a configuration ensures that the chip module, after the folding, points downward within the padded envelope. This means that the chip module comes to lie outside the franking and stamping area of the padded envelope. However, the smart card can still be fitted in a conventional way in the lower right-hand area of the further carrier.

With the objects of the invention in view, there is also provided a method for safely transporting a chip module carrier, including the steps of applying a flat carrier having a chip module to an area of a further carrier, folding the further carrier to create a folding line traversing the area occupied by the flat carrier, and enveloping the further carrier in a padded envelope.

With the objects of the invention in view, there is also provided a method for safely transporting a chip module carrier, including the steps of folding a carrier at a folding line from an original shape of the carrier, applying a flat chip module carrier to the carrier to at least partly traverse the folding line with the flat chip module carrier, folding the carrier back at the folding line to place the carrier in the original shape, and enveloping the carrier in a padded envelope.

Other features that are considered as characteristic for the invention are set forth in the appended claims.

Although the invention is illustrated and described herein as embodied in a configuration of a flat carrier with a chip module in a padded envelope and method of arranging the configuration, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

BRIEF DESCRIPTION OF THE DRAWINGS

FIG. 1A is a diagrammatic plan view of a first embodiment of the method according to the invention illustrating a first stage of a folding operation;

FIG. 1B is a diagrammatic plan and partially hidden view of a second stage of the folding operation of the method of FIG. 1A;

FIG. 1C is a diagrammatic plan and partially hidden view of a third stage of the folding operation of the method of FIG. 1A;

FIG. 2A is a diagrammatic plan view of a second embodiment of the method according to the invention illustrating a first stage of a folding operation;

FIG. 2B is a diagrammatic plan and partially hidden view of a second stage of the folding operation of the method of FIG. 2A;

FIG. 3A is a diagrammatic plan view of a first stage of a folding operation according to the prior art; and FIG. 3B is a diagrammatic plan and partially hidden view of a second stage of the prior art folding operation of FIG. 3A.

DESCRIPTION OF THE PREFERRED EMBODIMENTS

Referring now to the figures of the drawings in detail and first, particularly to FIGS. 1A to 1C thereof, there is shown, in various method steps, the configuration according to the invention of the flat carrier 1 on a further flat carrier 2 so that the flat carrier 1 comes to lie at the end in a position rotated through 90° with respect to the prior art. As already mentioned at the beginning, enveloping installations are configured such that the flat carrier in the form of a smart card 1 comes to lie on the right-hand side of the lower area C. Fixing the flat carrier 1 to the further carrier 2, for example, a paper in DIN A 4 format, can be carried out by a double-sided adhesive strip or a liquid adhesive. To achieve the position according to the invention of the flat carrier 1 with the chip module 3, two additional folding operations are necessary, according to the first exemplary embodiment.

As can be seen from FIG. 1A, before the flat carrier 1 is applied to the further carrier 2, the lower right-hand area D, which is part of the lower area C, is folded over along a folding line 8. In this case, the folding line 8 runs at a 45° angle with respect to the side edges 11, 12. The folding line 8 advantageously intersects the point of intersection of the folding line 5 with the side edge 12. The area D on which the flat carrier 1 is detachably fixed is, consequently, equilateral.

In such a case, the flat carrier 1 is fixed to the area D that is folded over forward (in the direction of the observer) such that the long side edges 14, 15 are initially placed parallel to the short side edges 10, 11 of the further carrier 2. The contact tabs of the chip module 3, which are placed in a row when they have contacts, therefore, lie parallel to the long side edges of the further carrier 2.

In the next step (FIG. 1B), the area D folded forward is folded back along its folding line 8, so that the further carrier 2 assumes its original shape. In this illustration, it can be seen particularly easily that the area D, whose rear D' is now visible, is formed by the folding line 8 and the side-edge cutouts 11' and 12'. As can be seen from the dashed border of the flat carrier 1, the flat carrier 1 now rests on the rear of the further carrier 2, not visible to the observer.

However, the reverse folding along the folding line 8 now has the effect that the flat carrier 1 comes to lie with its long side edges 14, 15 now parallel to the long side edges 12, 13 of the further carrier 2. Consequently, the position of the flat carrier 1 has been rotated through 90°. Accordingly, the position of the wire connections of the chip module 3 (now invisible in FIG. 1B) has also been rotated through 90°. The wire connections of the chip module 3 now extend over a side of the semiconductor chip that extends parallel to the transport direction (arrow 9 in FIG. 1C). The bending stresses produced by deflection rollers now can no longer lead to overstretching of the wire connections and, therefore, to damage to the chip module.

FIG. 1C shows the configuration of the flat carrier 1 in a drawing that is not true to scale following the folding of the further carrier 2 along its folding lines 5, 6 and enveloping in a padded envelope 7. This figure reveals that the chip module 3 is now placed such that it is placed close to the lower side edge 11 of the further carrier 2. Accordingly, the chip module 3 comes to lie in the padded envelope such that it does not lie in a franking or stamping area of the padded envelope. Damage caused by the franking or stamping of the padded envelope is, therefore, likewise avoided.

Of course, the area D in FIG. 1A could also be folded toward the rear of the further carrier so that the flat carrier 1 comes to lie on the front side (that side of the further carrier that is labeled with an address) after the area D has been folded back. Following the further folding along the folding line 5, 6, the flat carrier 1 would, then, come to lie "in the interior" of the further carrier 2 so that enveloping is very simply possible.

FIGS. 2A and 2B show a further exemplary embodiment according to the invention, in which a single fold along the folding line 8 is sufficient to bring the flat carrier 1 into the desired position. The folding line 8, again, extends between the side edges 11, 12 of the further carrier 2. Here, too, the folding line 8 is advantageously implemented such that it intersects the point of intersection of the folding line 5 and the side edge 12. The folding line 8 assumes a 45° angle with respect to the side edge 12. The triangular area D formed by the folding line 8, the side edge cutout 11' and the side edge cutout 12' is provided with an adhesive and the flat carrier 1 is, then, applied.

As FIG. 2A reveals, in this case the flat carrier 1 is applied in the standard position—that is to say, the long side edges 14, 15 of the flat carrier 1 come to lie parallel to the short side edges 10, 11 of the further carrier 2. The area D is, then, folded over rearward along the folding line 8 so that the chip module 3 is, now, invisible to the observer. Following the folding over, the chip module 3 comes to lie close to the side edge 11.

After the further folding along the folding lines 5, 6 so that the area A (for example, with the address field) is visible to an observer, the further carrier 2 can be enveloped in a padded envelope 7. The chip module 3 is, now, again placed such that it does not lie in a franking or stamping area. Once again, the situation has been achieved in which the chip module is disposed in the padded envelope such that the wire connections in the chip module extend over a side of the semiconductor chip running parallel to the transport direction.

In the above exemplary embodiments, reference has been made to a smart card that has contacts and whose chip module has contact tabs. Of course, it is also conceivable to configure a contactless or a hybrid smart card on a carrier, for example, a paper, by the method according to the invention. It is not necessary for a paper in DIN A 4 format to be used as the further carrier 2. Likewise, the further carrier 2 could be matched from the outset to the dimensions of the padded envelope 7, that is to say, the further carrier 2 would only have one area of the area C. Of course, any other paper format is also conceivable.

I claim:

1. A configuration for transporting a chip module carrier, comprising:
   a padded envelope having long side edges and short side edges to be transported in a transport device along a transport direction parallel to at least one of said long side edges; and
   a flat carrier having a chip module with a semiconductor chip and wire connections connected to said semiconductor chip, said wire connections having a length, said flat carrier being disposed in said padded envelope to extend said length of said wire connections over a side of said semiconductor chip running parallel to said transport direction.

2. The configuration according to claim 1, including a further carrier, said flat carrier with said chip module being detachably fixed to Bald further carrier.

3. The configuration according to claim 2, wherein:
   said padded envelope has dimensions; and
   said further carrier has dimensions matched to said dimensions of said padded envelope.

4. The configuration according to claim 2, wherein:
   said padded envelope has internal dimensions; and
   said further carrier has external dimensions substantially matched to said internal dimensions of said padded envelope for fitting into said padded envelope.

5. The configuration according to claim 1, wherein said chip module is disposed in said padded envelope to place said chip module in an area that cannot be stamped by a stamping or franking machine.

6. The configuration according to claim 1, wherein:
   said padded envelope has an area at which said padded envelope is stamped by a stamping or franking machine; and
   said chip module is disposed in said padded envelope to place said chip module outside said area.

7. The configuration according to claim 1, wherein said flat carrier is a smart card.

8. The configuration according to claim 7, wherein said smart card has long sides and is placed in said padded envelope with said long sides disposed at right angles to said transport direction.

9. The configuration according to claim 7, wherein said smart card has long sides and is placed in said padded envelope with said long sides disposed orthogonal to said transport direction.

10. In a padded envelope having long side edges and short side edges to be transported in a transport device along a transport direction parallel to at least one of the long side edges, a chip module carrier transporting configuration, comprising:
    a flat carrier having a chip module with a semiconductor chip and wire connections connected to said semiconductor chip, said wire connections having a length, said flat carrier to be disposed in the padded envelope to extend said length of said wire connections over a side of said semiconductor chip running parallel to the transport direction parallel to at least one of the long side edges.

11. A method for producing a configuration for transporting a chip module carrier, the method of which comprises:
    providing a padded envelope having long side edges and short side edges to be transported in a transport device along a transport direction parallel to at least one of the long side edges;
    providing a flat carrier having a chip module with a semiconductor chip and wire connections connected to the semiconductor chip, the wire connections having a length;
    applying the flat carrier with the chip module to an area of a further carrier;
    folding the further carrier to create a folding line traversing the area occupied by the flat carrier; and
    enveloping the further carrier in the padded envelope causing the flat carrier being disposed in the padded envelope to extend the length of the wire connections over a side of the semiconductor chip running parallel to the transport direction.

12. The method according to claim 11, wherein;
    the further carrier has a first side and a second side orthogonally disposed with respect to the first side; and the folding line runs from the first side to the second side and forms a triangular area.

13. The method according to claim 12, wherein the triangular area is equilateral.

14. The method according to claim 12, which comprises fixing the flat carrier in the triangular area.

15. The method according to claim 11, wherein:
the further carrier has folding lines and sides not intersecting any of the folding lines; and
the flat carrier is fixed to the further carrier to face the chip module towards the sides not intersecting any of the folding lines.

16. The method according to claim 11, wherein:
the further carrier has folding lines and sides not intersecting any of the folding lines; and
the flat carrier is fixed to the further carrier to face the chip module towards at least one of the sides not intersecting any of the folding lines.

17. A method for producing a configuration for transporting a chip module carrier, the method of which comprises:
providing a padded envelope having long side edges and short side edges to be transported in a transport device along a transport direction parallel to at least one of the long side edges;
providing a flat carrier having a chip module with a semiconductor chip and wire connections connected to the semiconductor chip, the wire connections having a length;
folding a further carrier with the chip module at a folding line from an original shape of the further carrier;
applying the flat carrier to the further carrier to at least partly traverse the folding line with the flat carrier;
folding the further carrier back at the folding line to place the further carrier in the original shape; and
enveloping the further carrier in the padded envelope causing the flat carrier being disposed in the padded envelope to extend the length of the wire connections over a side of the semiconductor chip running parallel to the transport direction.

18. The method according to claim 17, wherein;
the further carrier has a first side and a second side orthogonally disposed with respect to the first side; and
the folding line runs from the first side to the second side and forms a triangular area.

19. The method according to claim 18, wherein the triangular area is equilateral.

20. The method according to claim 18, which comprises fixing the flat carrier in the triangular area.

21. The method according to claim 17, wherein:
the further carrier has folding lines and sides not intersecting any of the folding lines; and
the flat carrier is fixed to the further carrier to face the chip module towards the sides not intersecting any of the folding lines.

22. A method for safely transporting a chip module carrier, which comprises:
providing a flat carrier having a chip module with a semiconductor chip and wire connections connected to the semiconductor chip, the wire connections having a length;
applying the flat carrier having the chip module to an area of a further carrier;
folding the further carrier to create a folding line traversing the area occupied by the flat carrier; and
enveloping the further carrier in a padded envelope having long side edges and short side edges to be transported in a transport device along a transport direction parallel to at least one of the long side edges, causing the flat carrier being disposed in the padded envelope to extend the length of the wire connections over a side of the semiconductor chip running parallel to the transport direction.

23. A method for safely transporting a chip module carrier, which comprises:
providing a flat chip module carrier having a chip module with a semiconductor chip and wire connections connected to the semiconductor chip, the wire connections having a length;
folding a carrier at a folding line from an original shape of the carrier;
applying the flat chip module carrier to the carrier to at least partly traverse the folding line with the flat chip module carrier;
folding the carrier back at the folding line to place the carrier in the original shape; and
enveloping the carrier in a padded envelope having long side edges and short side edges to be transported in a transport device along a transport direction parallel to at least one of the long side edges, causing the flat carrier being disposed in the padded envelope to extend the length of the wire connections over a side of the semiconductor chip running parallel to the transport direction.

24. A configuration for transporting a chip module carrier, comprising:
a padded envelope having long side edges and short side edges to be transported in a transport device along a transport direction parallel to at least one of said long side edges; and
a flat carrier having a chip module with a semiconductor chip and wire connections connected to said semiconductor chip in a wire connection direction, said flat carrier being disposed in said padded envelope to orient said wire connection direction and said wire connections orthogonal to said transport direction.

* * * * *

UNITED STATES PATENT AND TRADEMARK OFFICE
CERTIFICATE OF CORRECTION

PATENT NO. : 6,971,519 B2  
DATED : December 6, 2005  
INVENTOR(S) : Manfred Fries It is certified that error appears in the above-identified patent and that said Letters Patent is hereby corrected as shown below:

Column 8,
Line 3, "detachably fixed to Bald further carrier" should read -- detachably fixed to said further carrier. --.

Signed and Sealed this

Twenty-first Day of March, 2006

JON W. DUDAS  
*Director of the United States Patent and Trademark Office*